United States Patent [19]
Nighan, Jr. et al.

[11] Patent Number: 5,651,020
[45] Date of Patent: *Jul. 22, 1997

[54] CONFOCAL-TO-CONCENTRIC DIODE PUMPED LASER

[75] Inventors: William L. Nighan, Jr., Menlo Park; Mark S. Keirstead, San Jose; David R. Dudley, El Granada, all of Calif.

[73] Assignee: Spectra-Physics Lasers, Inc., Mountain View, Calif.

[*] Notice: The term of this patent shall not extend beyond the expiration date of Pat. No. 5,412,683.

[21] Appl. No.: 432,301

[22] Filed: May 1, 1995

Related U.S. Application Data

[63] Continuation-in-part of Ser. No. 191,772, Feb. 4, 1994, Pat. No. 5,412,683.
[51] Int. Cl.$^6$ .................................................. H01S 3/08
[52] U.S. Cl. ............................. 372/92; 372/97; 372/93; 372/69; 372/101; 372/71; 372/19
[58] Field of Search .............................. 372/75, 92, 101, 372/103, 97, 68, 71, 19

[56] References Cited

U.S. PATENT DOCUMENTS

| | | | |
|---|---|---|---|
| Re. 34,729 | 9/1994 | Sipes, Jr. | 372/75 |
| 4,710,940 | 12/1987 | Sipes, Jr. | 372/75 |
| 4,951,294 | 8/1990 | Basu et al. | 372/75 |
| 5,014,279 | 5/1991 | Esterowitz et al. | 372/75 |
| 5,048,051 | 9/1991 | Zayhowski | 372/101 |
| 5,117,436 | 5/1992 | Hanson | 372/75 |
| 5,127,068 | 6/1992 | Baer et al. | 385/34 |
| 5,130,995 | 7/1992 | Grossman et al. | 372/92 |
| 5,182,759 | 1/1993 | Anthon et al. | 372/97 |
| 5,271,031 | 12/1993 | Baer | 372/75 |
| 5,285,467 | 2/1994 | Scheps | 372/75 |
| 5,303,250 | 4/1994 | Masuda et al. | 372/92 |
| 5,307,358 | 4/1994 | Scheps | 372/92 |
| 5,412,683 | 5/1995 | Nighan, Jr. et al. | 372/92 |

FOREIGN PATENT DOCUMENTS

| | | | |
|---|---|---|---|
| 2-146784 | 6/1990 | Japan | 372/75 |
| 95/31022 | 11/1995 | WIPO | 372/92 |

OTHER PUBLICATIONS

"Diode Pumped Slab Lasers Operate at High Frequencies", Laser World Focuss, Jun. 1994, pp. 20 and 22.

De Sivestri, S et al. "Pump Power Stability Range of Single–Mode Solid State Lasers with Rod Thermal Lensing" IEEE Jou. of Quan. Elec., 23(11) Nov. 1987, pp. 1099–2004.

Steffen, J. et al., "Fundamental Mode Radiation With Solid–State Lasers", IEEE Jou. of Qaun. Elec., Feb., 1972, pp. 239–245.

International Application No. PCT/US95/0260 Search Report. Dec. 7, 1995.

Koechner, W., "Solid–State Laser Engineering", Springer–Verlag, 3rd Revised Edition, pp. 204–205, (1976, 1988, 1992). (no month avail.).

Siegman, A.E., "Lasers", University Science Books, Mill Valley, CA, pp. 750–759, (1986). (No month avail.).

Primary Examiner—Leon Scott, Jr.
Attorney, Agent, or Firm—Wilson Sonsini Goodrich & Rosati

[57] ABSTRACT

A high power diode pumped laser is disclosed which has at least one resonator mirror and an output coupler. At least one laser crystal with strong thermal focussing properties is included. The laser includes at least one diode pump source supplying a pump beam to the laser crystal, producing a thermal lens in the laser crystal. The combination of the laser crystal, thermal lens, resonator mirrors and output coupler create a confocal-to-concentric resonator. An output beam is generated, which may be polarized. Further, a Q-switch may be included in the resonator, particularly when the laser crystal is Nd:YAG.

52 Claims, 6 Drawing Sheets

CONFOCAL-TO-CONCENTRIC DIODE PUMPED LASER

CROSS-REFERENCE TO RELATED APPLICATIONS

This application is a continuation-in-part application of U.S. Patent application Ser. No. 08/191,772, filed Feb. 4, 1994, now U.S. Pat. No. 5,412,683, entitled "Confocal Diode Pumped Laser" having named inventors William L. Nighan, Jr. and Mark S. Keirstead, which is assigned to the assignee of the instant application and is herein incorporated by reference.

This application cross-references pending U.S. patent application Ser. No. 08/427,055, (Attorney Docket No. SPEC 8052 CIP1), filed Apr. 24, 1995, entitled "Diode Pumped Laser with Strong Thermal Focussing", having named inventors William L. Nighan, Jr. and Mark S. Kierstead, which is a continuation-in-part of U.S. patent application Ser. No. 08/191,655, filed Feb. 4, 1994, entitled "Diode Pumped Laser with Strong Thermal Lens Crystal", having named inventors William L. Nighan Jr. and Mark K. Kierstead, both applications are assigned to the assignee of the instant application and are herein incorporated by reference.

This application cross-references U.S. patent application Ser. No. 08/191,654, filed Feb. 4, 1994, entitled "Thermal lens of Controlled Ellipticity", having named inventors William L. Nighan Jr. and Mark K. Keirstead and is assigned to the assignee of the instant application and is hereing incoporated by reference.

BACKGROUND OF THE INVENTION

1. Field of the Invention

This invention relates generally to highly efficient, high power, $TEM_{00}$ lasers that have low sensitivity to misalignment with high beam pointing stability, and more particularly to diode pumped lasers that are nearly confocal, or between confocal and concentric, and that utilize crystals with strong thermal focusing, and to lasers of this type that are Q-switched.

2. Description of Related Art

There are many laser applications where insensitivity to misalignment and beam pointing stability are critical. These characteristics are desirable in order that the laser power and mode do not degrade upon vibration, shock or thermal cycling. There are also applications where an insensitivity of a laser's output to changes in its thermal lens are highly desirable; for example, a Q-switched laser that is used in an application requiring dynamic variations in repetition rate.

Confocal or nearly confocal resonators are suitable candidates when misalignment sensitivity and beam pointing stability are important considerations. With confocal resonators, the mode diameter throughout the resonator does not vary by more than about the square root of two. Another description is that the laser resonator is about 2 times as long as the Rayleigh range of the intracavity mode. The mode profile in a "concentric resonator" is somewhat different; it is analogous to the mode profile that would be found in a sphere. In fact, one type of perfectly concentric resonator is a simple two mirror resonator where the surfaces of the concave end mirrors define the surface of a sphere. In this type of concentric resonator, the mode diameter can be very small at one part of the resonator, but very large in another part of the resonator. In this case, the laser resonator is much longer than two Rayleigh ranges of the intracavity mode. Of course, there are analogous resonators that are in between these descriptions, or between the confocal and concentric descriptions. For example, a resonator might be approximately four times longer than the Rayleigh range of an intracavity waist of the eigenmode of the resonator.

Figure 1A:
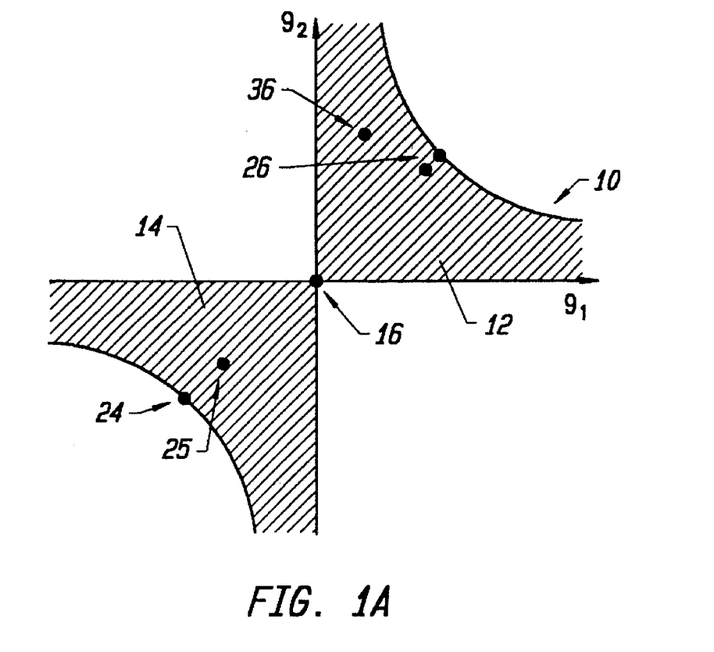
FIG. 1(a) is a stability diagram for a two mirror resonator. The diagram shows the stability parameter for different types of resonators, including those with lenses. An ideal confocal resonator is where $g_1$ and $g_2$ equal 0.
Figure 1B:
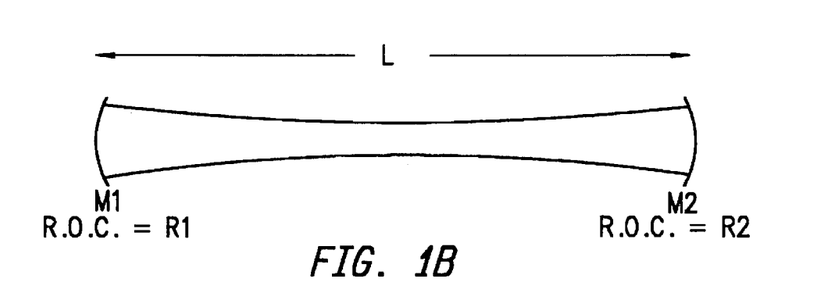
FIG. 1(b) illustrates a schematic diagram of a simple two mirror resonator with mirrors $M_1$ and $M_2$, each having a radius of curvature of $R_1$, $R_2$, respectively, of length L, but the drawing does not include a laser crystal.

A greater understanding of confocal or nearly confocal resonators can be ascertained with reference to FIG. 1(a), a stability diagram with two axes, $g_1$ and $g_2$. The classic values of the stability parameters $g_1$ and $g_2$ are defined as:

$$g_1 = 1 - L/R_1$$

$$g_2 = 1 - L/R_2$$

where L is the length of the resonator and $R_1$, $R_2$ are the respective radii of curvature of mirrors $M_1$ and $M_2$ of the resonator, shown in FIG. 1(b). A two mirror laser resonator is stable if $0 < (g_1)(g_2) < 1$. The $TEM_{00}$ mode size of a resonator can be represented in terms of $g_1$ and $g_2$, and the stability parameters can also be used to judge misalignment sensitivity and other practical resonator characteristics. This classic discussion can be found in W. Koechner, *Solid State Laser Engineering*, 3rd edition, Springer-Verlag, N.Y., p. 204–205 (1992).

Figure 1C:
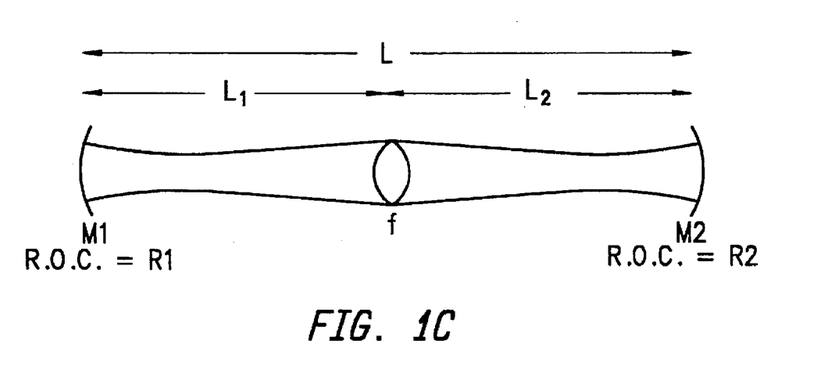
FIG. 1(c) illustrates a two mirror resonator with an intracavity lens.

It should be noted that this stability analysis can be extended to a resonator with an intracavity lens or lenses, shown in FIG. 1 (c). The intracavity lens can be a conventional lens or a thermal lens. A thermal lens can be generated in a laser crystal by diode pump light, or by lamp pump light. In this case, the g parameters become:

$$g_1 = 1 - (L_2/f) - (L_0/R_1)$$

$$g_2 = 1 - (L_1/f) - (L_0/R_2)$$

where $L_0 = L_1 + L_2 - (L_1 L_2 f)$, and $L = L_1 + L_2$, as shown in FIG. 1(c), $R_1$ and $R_2$ are defined as in the case of no lens, and with f as the focal length of the intracavity lens which can be a thermal lens. This background is also presented in W. Koechner, *Solid State Laser Engineering*, 3rd edition, Springer-Verlag, N.Y. p. 204–205 (1992).

It should therefore be noted that the traditional two mirror stability analysis, with stability parameters $g_1$ and $g_2$, is still useful when more complicated, multiple mirror and lens resonators are being considered.

With reference now to FIG. 1 (a), in the upper right quadrant, a hyperbola 10 defines a region 12, bounded between hyperbola 10 and the g axes. For a resonator with values of $g_1$ and $g_2$ within region 12, a gaussian mode can exist. Hyperbola 10 has the characteristic that $(g_1)(g_2) = 1$. Region 12 represents a stable regime; a gaussian mode can exist between the two mirrors defining the resonator. In the lower quadrant 14, another stable regime is found; gaussian modes can also exist for these g values. The ideal confocal resonator corresponds to point 16, the intersection of the $g_1$ and $g_2$ axis, where $g_1 = g_2 = 0$. A resonator can be called nearly confocal if $g_1$ and $g_2$ are not too large.

Figure 2:
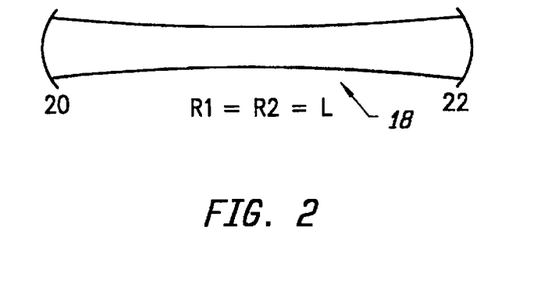
FIG. 2 is a schematic diagram of a simple two mirror confocal resonator. The mirrors each have a radius of curvature R1 and R2 respectively, and are separated by a distance L.

In FIG. 2, an ideal confocal resonator 18 is defined by two opposing mirrors, 20 and 22, each having a radius of curvature $R_1$ and $R_2$, respectively. Mirrors 20 and 22 are separated by a distance L. For an ideal confocal resonator 18, $R_1 = R_2 = L$. If a lens is used at the center of the cavity and flat mirrors are used, a confocal resonator arises when $f = L/2$. A combination of lenses and curved mirrors can also produce a confocal resonator.

Referring again to FIG. 1 (a), a plane parallel resonator corresponds to points indicated at 24, where $g_1 = g_2 = 1$. The values of $g_1$ and $g_2$ place this resonator right on the edge of the stability diagram, and for applications requiring insensitivity to misalignment and pointing stability, the plane parallel resonator is typically not the best choice.

A large radius resonator exists when $R_1$ and $R_2$ are much larger than L, and corresponds to points 26 in FIG. 1(a). Large radius resonators are useful for diode pumping. In one embodiment of a large radius resonator, a Nd:YLF crystal is used and the mode size of the $TEM_{00}$ is large, which facilitates conventional mode-matching. This resonator is, however, sensitive to misalignment, and may have reduced pointing stability. As an example, a large radius resonator of length L with R=10L, is five times more sensitive to misalignment than the confocal resonator of length L. This is also shown by the Koechner reference.

A concentric or spherical resonator, where $R_1=R_2=L/2$, is represented at 24. In this case, $g_1=g_2=-1$. It has the properties that the mode can be very large at one point of the resonator, and very small at the other. This is mainly because the mirrors are on the surface of a sphere. The $TEM_{00}$ modes of such a resonator are very small at the center of the resonator, but very large at the ends. An equivalent resonator can be constructed using a lens or lenses and flat mirrors, or with a combination of lenses and curved mirrors.

Figure 3:
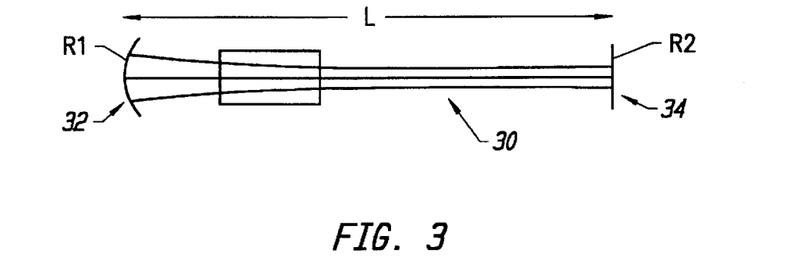
FIG. 3 is a schematic diagram of a half symmetric confocal resonator with two mirrors. One of the mirrors is flat. The curved mirror has a radius of curvature, R1 equal to 2L, where L is the distance between the two mirrors. The flat mirror has a radius of curvature equal to infinity.

A half symmetric resonator 30 is illustrated in FIG. 3. It is defined by a curved mirror 32 and a flat mirror 34, separated by a distance L. In this instance, $R_1$ is the radius of curvature of mirror 32. Because mirror 34 is flat, it has an infinite radius of curvature. A half symmetric resonator can be made to have equivalent properties with that of a confocal resonator, if $g_2=1$ and $g_1 \sim \frac{1}{2}$. In FIG. 1(a), the half symmetric confocal resonator corresponds to point 36 on the stability diagram. A half symmetric resonator can also be a large radius resonator, where one mirror is flat, and the other has a curvature $R_1 \gg L$. Again, an equivalent resonator can be constructed using a lens or lenses and flat mirrors, or with a combination of lenses and curved mirrors.

Because a confocal resonator is relatively insensitive to misalignment, a mirror can be tilted a certain amount and the laser output power does not drop as rapidly as with other types of lasers. The mode in the confocal resonator does not change or move very much as mirrors are tilted. Because the confocal's pointing stability and its misalignment sensitivity are very good, for example as a function of environmental changes, this type of resonator has some useful properties.

A major disadvantage of a confocal resonator is that it has the smallest average $TEM_{00}$ mode diameter of any resonator of any length L. In essence, the $TEM_{00}$ mode volume of the confocal resonator of length L is smaller than that of other resonators of length L. This makes conventional mode matching difficult.

This is taught in A. E. Siegman, *Lasers*, University Science Book, Mill Valley, Calif., p. 750–759, 1986. Because of its small average size, the $TEM_{00}$ mode in a confocal resonator is not very effective in extracting power from a large diameter gain medium. Additionally, because of the small average size of the $TEM_{00}$ mode, a confocal resonator is very likely to oscillate in a combination of the lowest and higher order modes. An important design goal for many diode pumped solid state lasers is the generation of nearly diffraction limited $TEM_{00}$ output at the highest possible efficiency and power. Because of the small $TEM_{00}$ mode size of a confocal resonator, and its tendency to oscillate in a combination of the lowest and higher order modes, diode end pumping a confocal resonator has not been considered useful.

The effect of mode-matching is to maximize the coupling between the $TEM_{00}$ mode and the excited volume in the crystal. In turn, the optical slope and the overall optical efficiencies of the laser are both maximized. In a classic mode-matched geometry, the ratio of the $TEM_{00}$ mode diameter to the diameter of the pump beam in an Nd:YAG pumped laser is about 1.3 or greater. Because of the small $TEM_{00}$ size, this ratio is more difficult to achieve with a confocal resonator.

The thermal lens in a laser crystal can be used in combination with mirror curvatures or conventional lenses to design a nearly confocal resonator. Certain crystals exhibit strong thermal lens characteristics, these laser crystals have other important properties that make them suitable candidates for laser resonators. For example, in comparison to Nd:YLF, the strong thermal lens material Nd:YVO$_4$ has a high gain and a short upper state lifetime. These properties provide important adjustable parameters when designing a Q-switched laser with high pulse energy or high repetition rate, or a laser that is insensitive to optical feedback. Additionally, Nd:YVO$_4$ has a high absorption coefficient at the diode pump wavelength of ~809 nm, permitting efficient coupling of diode pump light into the Nd:YVO$_4$ crystal.

Many laser crystals have strong thermal lenses, such as Nd:YAG and Nd:YVO$_4$. With a strong thermal lens, the focussing power of the pump induced lens is at least comparable to that of the other optics in the laser resonator. A strong thermal lens significantly changes the size and divergence of a laser resonator eigenmode within the resonator.

With a weak thermal lens, the focussing power of the pump induced lens is substantially lower than that of the other optics in the laser resonator such as mirrors and typical lenses. The other optics in the laser resonator dictate the size and divergence of the resonator eigenmode.

It is clear that a thermal lens can be used to build a nearly confocal resonator. However, it has been thought that the large aberrations of strong thermal lens materials limit the efficiency of high power resonators. It has been generally believed that strong thermal lensing is a hindrance in the design and construction of an efficient laser with high $TEM_{00}$ beam quality, high power and high efficiency. Therefore, successful use of strong thermal lens materials at higher pump powers has been limited.

Additionally, classical mode-matching has taught that $TEM_{00}$ mode diameter to pump beam diameter ratios less than unity are of little interest since laser threshold is high and the achievable conversion efficiency is poor. Ratios of less than unity result in lower gain while those approaching and exceeding unity can result in higher loss due to aberration. It is more difficult to achieve a ratio greater than unity with a nearly confocal resonator since the $TEM_{00}$ mode size is small. This feature goes against the teaching of conventional mode matching.

The use of diodes as pump sources for confocal resonators is desirable for reasons of cost, size and wall plug efficiency. Some strong thermal lens materials have certain properties that would make them useful for diode pumped lasers.

Another useful resonator type can be described as "in between" confocal and concentric. This can be called a confocal-to-concentric resonator. In Koechner, *Solid State Laser Engineering*, Vol. 3, p. 206, a resonator sensitivity analysis shows that a resonator with $(g_1)(g_2)=0.5$ features a mode size that is fairly insensitive to changes in the g parameter values. This means that small changes in thermal lens focal powers are relatively well tolerated in this type of laser. A number of laser resonators can be built with $(g_1)(g_2)=0.5$. This is represented by g values near point 25 in FIG. 1(a).

It would be desirable to have a compact, efficient low cost diode pumped laser that is sensitive to misalignment and has high pointing stability. It would also be desirable to provide a confocal-to-concentric resonator that has these properties, e.g. diode pumped, provides high output power, is highly efficient, and uses strong thermal lens materials. The laser may also have a $TEM_{00}$ mode diameter in the laser crystal that is less than of the pump beam. It would also be useful to provide a Q-switched laser with similar characteristics, especially for applications that demand dynamic variations in the repetition rate of the Q-switched laser.

SUMMARY OF THE INVENTION

It is an object of the invention to provide a confocal-to-concentric resonator that is diode pumped.

Another object of the invention is to provide a high efficiency, high power, diode pumped, confocal-to-concentric resonator.

Still another object of the invention is to provide a high efficiency, diode pumped, confocal-to-concentric resonator with nearly diffraction limited output.

Another object of the invention is to provide a confocal-to-concentric resonator which uses laser crystals that exhibit strong thermal focussing.

It is an object of the invention to provide a confocal-to-concentric diode-pumped solid state laser that is repetitively Q-switched.

A further object of the invention to provide a confocal-to-concentric diode-pumped solid state laser that provides a polarized beam.

Yet a further object of the invention to provide a confocal-to-concentric diode-pumped solid state laser that uses a laser crystal that exhibits thermal birefringence.

Another object of the invention to provide a confocal-to-concentric diode-pumped solid state laser that is optimized to minimize the detrimental effects of thermal birefringence.

Still another object of the invention to provide a diode-pumped solid state laser that utilizes laser crystals which exhibit strong thermal focussing, the laser resonator being on the order of one to several Rayleigh ranges in length.

These and other objects of the invention are achieved in a high power diode pumped laser. Included is at least one resonator mirror and an output coupler. At least one laser crystal with strong thermal focussing properties is provided. The laser includes at least one diode pump source supplying a pump beam to the laser crystal, producing a thermal lens in the laser crystal. The combination of the laser crystal, thermal lens, resonator mirrors and output coupler create a confocal-to-concentric resonator. An output beam is generated.

In another embodiment, the present invention is a high power, diode pumped laser. At least one resonator mirror and an output coupler are included. Also provided are at least one laser crystal with strong thermal focussing properties. At least one diode pump source supplies a pump beam to the laser crystal. This produces a thermal lens in the laser crystal. The combination of the laser crystal, thermal lens, resonator mirrors and output coupler create a resonator that is greater than 0.5 Rayleigh ranges in length.

Further, a nearly diffraction limited, high efficiency, diode pumped laser can include a confocal-m-concentric resonator. A strong thermal lens laser crystal is positioned in the resonator. A diode pump source supplies a pump beam to the laser crystal in the resonator to produce an output beam, and create a pump beam diameter in the laser crystal that is greater than a $TEM_{00}$ mode diameter.

In a further embodiment, the laser can be multi port, and can also include one or more fold arms.

The resonator can have a multiple Rayleigh range, and an optical slope efficiency in a $TEM_{00}$ mode of greater than about 40%. The laser may have an optical efficiency of greater than about 25%, and a ratio of a $TEM_{00}$ mode diameter of the laser crystal to a pump beam diameter in the crystal is about less than 1.0 to 0.83. Thermal birefringence can be reduced because the output beam diameter is larger than the $TEM_{00}$ mode diameter. In certain instances the laser includes a Q-switch. A variety of different laser crystal materials may be used including but not limited to $Nd:YVO_4$ and Nd:YAG.

DETAILED DESCRIPTION

The high efficiency, high power diode pumped laser, of the present invention, has a resonator mirror or mirrors and an output coupler defining a nearly confocal resonator. A laser crystal is positioned in the resonator along a resonator optical axis. A diode pump source supplies a pump beam to the laser crystal and produces an output beam. A power source supplies power to the diode pump source. Aperture stops can be included for improved $TEM_{00}$ operation.

For purposes of the present invention, a nearly confocal resonator means exactly confocal and also includes:

a symmetric resonator where $g_1=g_2$, and $g_1$, $g_2<0.5$, or the cavity length L is about twice the Rayleigh range of a waist of the resonator eigenmode, where the Rayleigh range is $$R = \frac{wo^2}{\lambda}$$

where wo=waist radius size and λ=wavelength.

A perfect symmetric confocal resonator is $g_1=g_2=0$, or L=2R exactly.

If the resonator is half-symmetric, then $g_1$ or $g_2$~1 and the other g parameter is near 0.5, or the cavity length L is about one Rayleigh range of a waist of the resonator eigenmode.

Additionally, nearly confocal also includes those asymmetric resonators of length L that share properties with nearly confocal symmetric and half-symmetric resonators. The g parameters may differ from the above definitions, but the length of the resonator is on the order of 1 to 2 Rayleigh ranges as defined above.

A confocal-to-concentric resonator is defined as one where $(g_1)(g_2)$ is approximately equal to 0.5. These resonator feature mode sizes that are relatively insensitive to small changes in the g parameters, as is well-known. This can be true even if the resonator is not completely symmetric. These resonator designs exhibit favorable behavior even if they are not perfectly symmetric. Additionally, these types of resonators work well with materials that exhibit strong thermal focussing, like $Nd:YVO_4$ or Nd:YAG, and that they work well when these lasers are used in a repetitively Q-switched manner. For example, when the repetition rate of a Q-switched Nd:YAG laser is varied from 20 kHz down to 1 kHz, the average power extraction from the laser is typically not constant, if pumping power is held constant. In a lamp-pumped system, there is typically so much heat dissipated in the Nd:YAG laser crystal that this change in power extraction has minimal effect upon the lamp-pump-induced thermal lens in the Nd:YAG crystal. However, in a diode-pumped system, this change in power extraction can have a significant and problematic effect upon the thermal lens in the diode-pumped Nd:YAG crystal. The effect can be severe enough to prevent stable 1 kHz Q-switched operation (for example, 1–2 W output) of a high power diode-pumped Nd:YAG laser when the laser is optimized for maximum output at 20 kHz (for example, 6–10 W output).

The reduction in repetition rate and power extraction can result in an excessive change in the effective focal length of the diode-pump-induced thermal lens. This problem is solved in the present invention by building a confocal-to-concentric resonator, utilizing the thermal lenses in the Nd:YAG crystal as a variable focussing element in the laser cavity. Dynamic variation in repetition rate is possible, from 50 kHz to very low frequencies, with minimal change in the output spatial characteristics of the diode-pumped Nd:YAG laser, and with very good pulse-to-pulse stability. This laser is useful for resistor-trimming applications, where repetition rates are varied according to the processing requirements for a particular resistor material.

Resonators that are between plane-parallel and confocal can have $(g_1)(g_2)=0.5$ and can have similar favorable properties to the confocal-to-concentric resonators. The discussion of confocal-to-concentric resonators therefore extends to plan-parallel to confocal resonators.

Resonator lengths that are a few Rayleigh ranges in length (1 to 5 Rayleigh ranges, for example) are found to be relatively insensitive to thermal lens aberrations, and are considered to be a part of this invention. The Rayleigh range is defined as $W_o^2/\lambda$, as is well known, where in this case the beam radius size $W_o$ is the radius of an intracavity waist, a nearby extracavity waist, or a nearby virtual or apparent waist of the resonator. Resonators that have eigenmode beam propagations of this type are less sensitive to loss due to aberrations in the thermal lens, even for mode size/pump size ratios close to 1 or greater than 1, and even for resonators that are not symmetric.

For purposes of the present invention, the following definitions apply:

Strong thermal lens: The focussing power of the pump induced lens is at least comparable to that of the other optics in the laser resonator. A strong thermal lens significantly changes the size and divergence of a laser resonator eigenmode within the resonator.

Weak thermal lens: The focussing power of the pump induced lens is substantially lower than that of the other optics in the laser resonator such as mirrors and typical lenses. The other optics in the laser resonator dictate the size and divergence of the resonator eigenmode.

The laser of the present invention has an optical efficiency is greater than 25%. In a preferred embodiment, its optical efficiency is greater than 40%. High power, polarized $TEM_{00}$ operation of the laser is an output beam greater than 4 W in a $TEM_{00}$ mode. Its output is substantially $TEM_{00}$, or nearly diffraction limited, if at least 95% of the power of output beam is measured to an $M^2$ value less than 1.2, where $M^2$ is defined as the ratio of theoretical confocal parameter of a beam, as predicted by an extracavity waist size, to the actual measured confocal parameter. In a preferred embodiment, $M^2$ is<1.05. The output beam profile has a least squares deviation from an ideal gaussian profile of less than 10%. In a preferred embodiment, this deviation is less than 1%, and the output beam is substantially polarized. Additionally, in certain embodiments, the laser may use a laser crystal where the diode pump induced thermal lens in the crystal provides an optical path difference as a function of radius that is not described by a parabolic profile.

Figure 4:
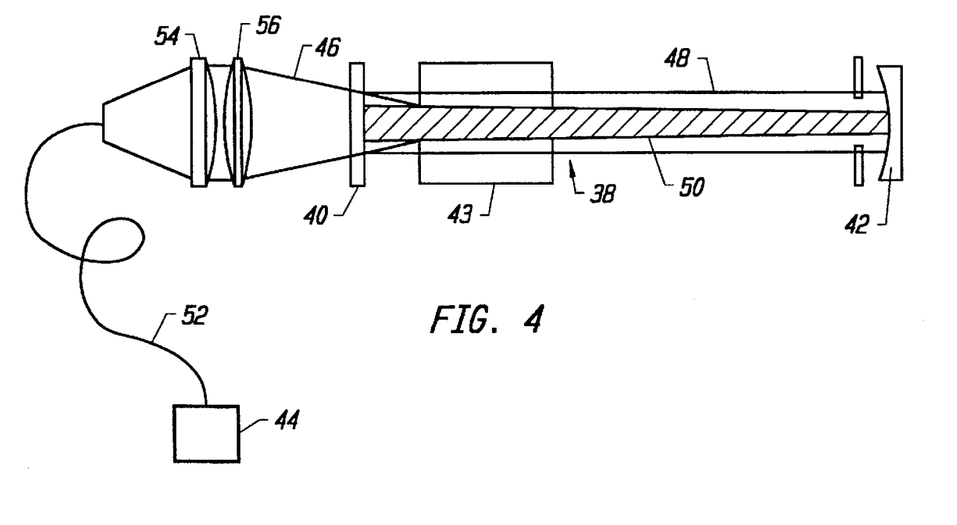
FIG. 4 is a schematic diagram of a long radius mirror resonator using an Nd:YLF laser crystal, and for comparison shows the mode size of a laser using an Nd:YV04 crystal.

In FIG. 4, a long radius mirror resonator 38 includes a high reflector 40, output coupler 42, laser crystal 43 and a diode pump source 44. If laser crystal 43 is Nd:YLF, and with a pump beam 46 with a diameter of about 0.7 mm incident upon crystal 43, the $TEM_{00}$ mode diameter 48 is about 1 mm, and it remains fairly constant in resonator 38. With a strong thermal lens material with strong thermal aberrations, such as Nd:YAG or $Nd:YVO_4$, the same pump diameter can produce a $TEM_{00}$ mode diameter 50 of about 0.56 mm (this occurs because of the thermal lens that the pump beam generates, in combination with other optics in the resonator). The $TEM_{00}$ mode size is slightly smaller than the pump diameter. The laser is highly efficient in spite of this deviation from conventional mode matching. This configuration is optimal because of the diffractive losses from aberrations at the edges of the pump spot.

Diode pump source 44 can be a single diode, spatial emitter, diode bar or a plurality of diodes, diode arrays, or diode bars. A suitable diode source 44 is model No. OPC-A020-810-CS, available from OptoPower Corporation, City of Industry, Calif. A similar model is denoted B020. Multiple diodes are typically used, such as two, or more if needed. However, one can be used if the available power is sufficient. Preferred wavelengths of diode source 44 are in the range of 795 to 815 nm. Peak absorption wavelengths of specific crystals are approximately as follows: Tm:YAG—785 nm; Nd:YLF—797; and Nd:YAG, Nd:YVO4—809 nm.

Diode source 44 is coupled to one or more optical fibers 52. Preferably, a bundle of optical fibers 52 are utilized. Coupling can be accomplished as set forth in U.S. Pat. No. 5,127,068. Suitable fibers 52 include but are not limited to those that have silica cores with silica cladding. The present invention can also utilize diodes that are not fiber-coupled.

A telescope arrangement provides for the focussing of the output beam from diode source 44 so that it is incident on laser crystal 43. In one embodiment, with Nd:YVO$_4$, the telescope arrangement includes first and second lenses, 54 and 56, that optimize the size of pump beam 46 to avoid fracture of crystal 43, but produce a pump beam such that the ratio of the TEM$_{00}$ mode diameter to pump beam diameter is less than unity (for example, ~0.85). In another embodiment, with Nd:YAG in a Q-switched laser, this ratio can be less than one (such as~0.85) or close to one, but the resonator is a few Rayleigh ranges in length and also features $(g_1)(g_2)$ near 0.5.

In a confocal resonator with no lens, two opposing mirrors are used which have radii of curvature $R_1$ and $R_2$, respectively, and the two mirrors are separated by a distance L, where $R_1 = R_2 = L$. This is, again, a perfect confocal resonator. A strong thermal lens changes the ideal distances and curvatures, since the thermal lens has a strong effect on the mode propagation in the resonator.

Strong thermal lens materials can be used for the laser crystal with the present invention. Suitable strong thermal lens materials include but are not limited to Nd:YAG, Nd:YVO$_4$, Nd:GVO$_4$, Nd:YPO$_4$, Nd:BEL, Nd:YALO and Nd:LSB. A preferred material is Nd:YVO$_4$, available from Litton-Airiron, Charlotte, N.C. The atomic percentage of Nd is in the range of 0.5 to 3.0%, preferably about 0.6 to 0.9% and most preferably about 0.8%. An embodiment configured for high continuous wave power at 1.064 µm utilizes Nd:YVO$_4$ of dopant level approximately 0.5%. This laser generates over 13 W in a TEM$_{00}$ mode for 26 W of pump power.

Nd:YVO$_4$ is an attractive material for certain applications because, compared to Nd:YLF, it exhibits high gain and a short upper state lifetime. Nd:YAG has an intermediate gain and an intermediate upper state lifetime. Nd:YVO$_4$ is also suitable for diode pumping because its absorption coefficient at the diode pump wavelength of ~809 nm is extremely high, permitting efficient coupling of diode pump beam 46.

Optical, thermal and mechanical characteristics of Nd:YVO$_4$ are different along its "a" and "c" axes. The thermal expansion coefficient in a direction parallel to the "a" axis is about 2.5 times smaller than that parallel to the "c" axis. The variation of the index of refraction, as a function of temperature, is different by about a factor of 2.8 along the "c" and "a" axes. Because Nd:YVO$_4$ is so strongly birefringent, there is more than a 10% difference between the indexes of refraction for the two crystallographic axes.

Nd:YVO$_4$, and other crystals that have strong thermal lens properties, can have a thermal lens of controlled ellipticity, such as circular, by proper control of heat conduction in the crystal, as described in U.S. Ser. No. 08/191,654, filed Feb. 4, 1994.

Figure 5:
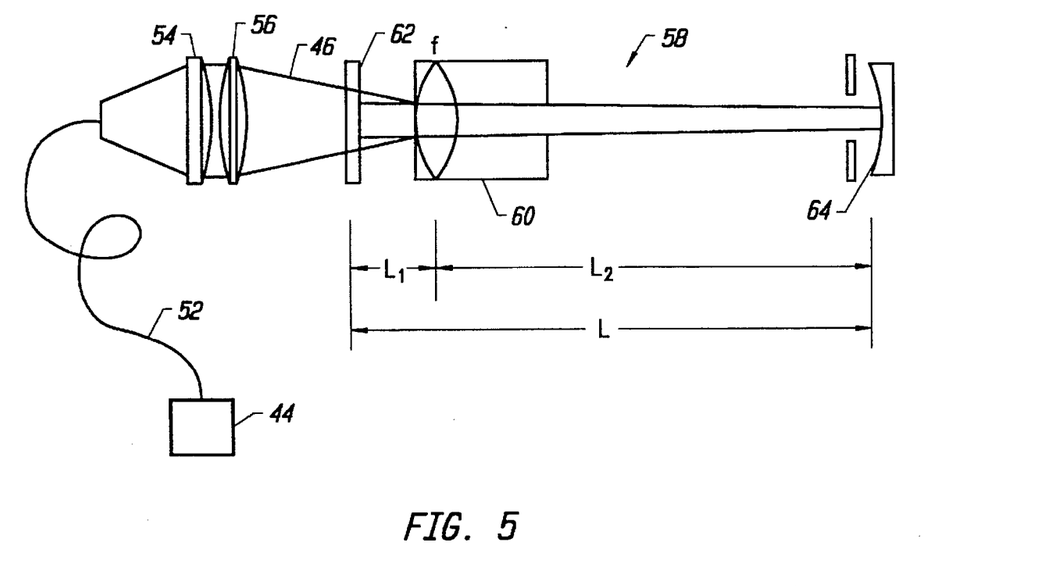
FIG. 5 is a schematic diagram of an asymmetric resonator.

In FIG. 5, a half symmetric resonator 58 includes a laser crystal 60. Resonator mirror 62 and output coupler 64 define a resonator cavity of length L. In FIG. 5, as with all Figures in this disclosure, like reference numerals denote the same elements. The distance between resonator mirror 62 and laser crystal 60 is L1, and the distance between output coupler 64 and laser crystal 60 is L2. Resonator 58 can be made to become almost a perfect confocal resonator when L1<<L2, F=L, and R1, R2>>L. R1 is the radius of curvature of resonator mirror 62, R2 is the radius of curvature of output coupler 64, and F is the focal length of laser crystal 60.

Additionally, a strong thermal lens material, such as Nd:YAG or Nd:YVO$_4$, can be used as the laser crystal 60 in order that its focussing power modifies the resonator and its stability. In essence, the positions of the g parameters of this laser on the stability diagram of FIG. 1(a) are moved more towards that of a perfect confocal resonator. The effects of a strong thermal lens may be sufficient to create a confocal resonator even with flat mirrors. However, it is preferred if curved mirrors are employed. This can improve the sensitivity of the laser to misalignment. Another useful configuration is confocal-to-concentric, which is especially useful for a Q-switched Nd:YAG laser.

Figure 6:
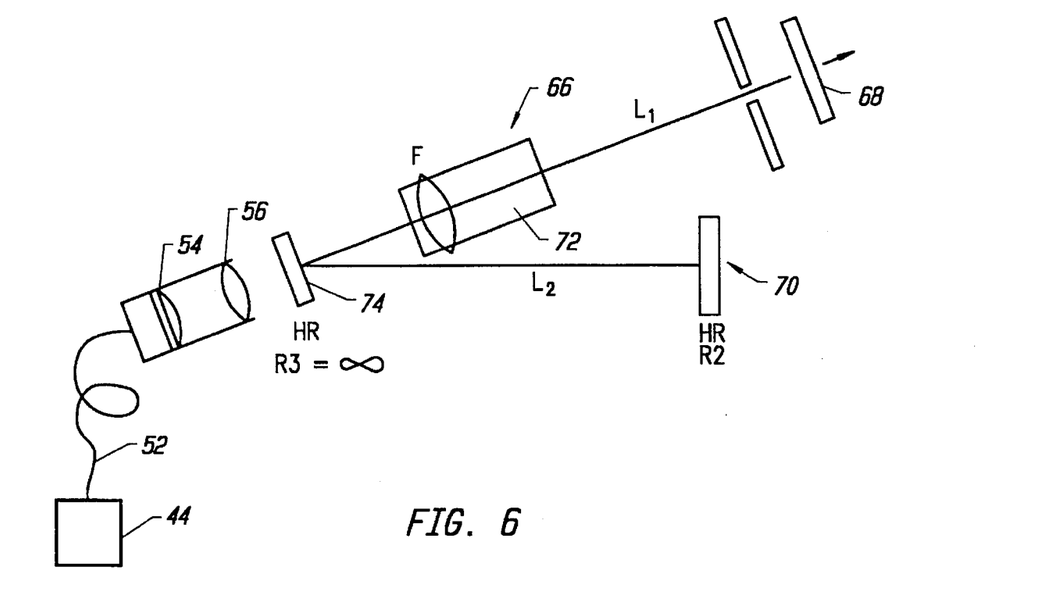
FIG. 6 is a schematic diagram of a symmetric resonator that is folded and has a single port.

FIG. 6 shows a symmetric nearly confocal resonator 66 with a folded geometry. The resonator is defined by an output coupler 68, with a radius of curvature R1, and a resonator mirror 70, with a radius of curvature R2. L1 is the distance between output coupler 68 and laser crystal 72, L2 is the distance between resonator mirror 70 and laser crystal 72. Fold mirror 74 is typically flat, and therefore has a radius of curvature R3 equal to infinity. For a symmetric resonator, L1=L2, and R1=R2. Laser crystal 72 is a strong thermal lens material such as Nd:YAG or Nd:YVO$_4$, with a thermal lens of controlled ellipticity.

Figure 7:
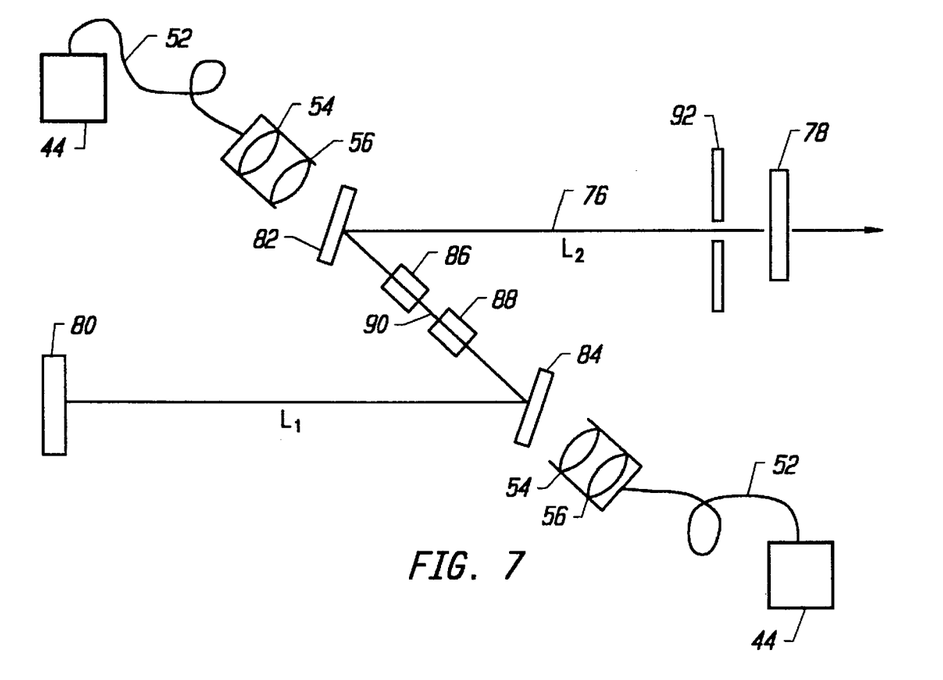
FIG. 7 is a schematic diagram of a two port resonator.

A "two port" resonator 76, shown in FIG. 7, is defined by an output coupler 78 with radius of curvature of R1, a resonator mirror 80 with radius of curvature R2, and two fold mirrors 82 and 84 that define a fold arm of resonator 76. The term "port" refers to a point where diode pump light is input. Two laser crystals 86 and 88 are positioned along a fold arm optical axis 90. Although two crystals are shown, it is possible to use one. Two diode pump sources 44, two sets of optical fibers 52 and two sets of telescope arrangements of lenses 54 and 56 are included. It is possible to use one diode pump source and a bifurcated fiber bundle. Two pump sources are used to increase the output power of resonator 76. In order to minimize damage to the laser crystals, two crystals 86 and 88 are used. Crystals 86 and 88 can be made of a strong thermal lens material including but not limited to Nd:YVO$_4$. It is also possible to use only one crystal when a single Nd:YVO$_4$ crystal is used, it is possible to generate over 13 W of TEM$_{00}$ output for 26 W of incident pump light.

Fold mirrors 82 and 84 are dichroic. The optics are HR at the laser wavelength, and HE at the pump wavelength. They can be called "pump windows". Two pump beams, each coming from a diode pump source 44, each provide half of the total pump power. Again, this provides a margin against exceeding the fracture limit of the incident face of the laser crystal. The two pump beams are configured in such a way as to insure their antiparallelism in the laser crystal and their coaxial propagation with respect to the TEM$_{00}$ mode of resonator 76. This produces a cylindrically shaped pump volume, and a normally radially symmetric composite thermal lens.

Optimal transverse alignment of the two telescope devices that image the pump light into crystals 86 and 88, through lenses 54 and 56, can be achieved by insuring that the pump light from diode sources 44, through one fiber 52, or bundle of fibers, is optimally coupled into the other fiber 52, or bundle of fibers, in the absence of laser crystals 86 and 88. Upon insertion of crystals 86 and 88 it is not necessary to make significant further adjustments to the transverse alignment of the telescopes, but some adjustment may be desired as the entire telescope system is locked in place. A simple optimization of the longitudinal positions of the two telescopes may be necessary after the insertion of crystals 86 and 88. Output coupler 78 and resonator mirror 80 may also be adjusted to ensure the concentricity of the pumped cylindrical volume and the TEM$_{00}$ mode of resonator 76. An aperture 92 may be included to ensure oscillation in the lowest order mode. This is typically required.

When a strong thermal lens crystal is used, such as Nd:YAG or Nd:YVO$_4$, the magnitude of the thermal lenses in crystals 86 and 88 is such that resonator 76 cavity can be nearly confocal. Resonator 76 is geometrically symmetric about its center, ensuring that the mode size in both crystals 86 and 88 is nearly identical, and that losses due to the aberrated parts of the thermal lenses are minimized. The TEM$_{00}$ mode sizes in the two highly aberrated pumped volumes are nearly identical. Additionally, the two pumped volumes in crystals 86 and 88 are nearly identical. The close proximity of crystals 86 and 88 allows them to act nearly as a single composite lens and minimizes undesirable dynamic behavior between them and the spatial mode of resonator 76. The close proximity of crystals 86 and 88 to the midpoint of resonator 76 ensures its symmetry. A single crystal can also be used.

In one embodiment, the resonator has an overall length of approximately 20 cm, and the composite thermal lens crystals 86 and 88 are at the center of the cavity of approximate composite focal length F equal to about 9 cm. A single crystal can also be used. This is achieved for 13 W incident power per port. An aperture 92 is used to ensure TEM$_{00}$ operation. In this embodiment, dichroic fold mirrors 82 and 84 are flat. Additionally, in this embodiment output coupler 78 and resonator mirror 80 are flat, or are of long radius curvature. In another embodiment, resonator 76 has a length of about 23 cm, with the same thermal lens power, and includes flat fold mirrors 82 and 84. However, output coupler 78 and resonator mirror 80 are of 60 cm curvature. The resonator of this embodiment is easier to align at low power due to the mirror curvatures, and exhibits excellent pointing stability and insensitivity to misalignment. When Nd:YVO$_4$ is used, over 13 W of output power can be generated in a round, TEM$_{00}$ mode, for 26 W of incident diode pump power, which is therefore>50% optical-to-optical efficiency. In both embodiments, the resonators are nearly confocal; the mode size from one end of the resonator to the other varies by not much more than a factor of the square root of 2. In some cases, these resonators are confocal-to-concentric. In this case, the mode size varies by about a factor of two from one end of the resonator to the other, which is similar to the case of the confocal resonator. With regard to the stability diagram of FIG. 1(a), both resonators are in the lower half of the diagram, between confocal and concentric, as compared to the upper half, which is between confocal and plane parallel.

The ratio of TEM$_{00}$ mode diameter in crystals 86 and 88 to pump beam diameter is from 1.2 to as low as 0.6. In one embodiment it is 0.83.

The ratio of the TEM$_{00}$ mode diameter in crystals 86 and 88 is less than unity in one embodiment. When a fiber bundle is utilized, the ratio of the TEM$_{00}$ mode diameter of each crystal 86 and 88, to the diameter of a nearly top hat shaped pump beam, is less than unity to about 0.83. This is in contrast to prior teachings that a ratio of less than unity is inefficient. The TEM$_{00}$ mode diameter in crystals 86 and 88 is defined traditionally as the diameter at which the mode intensity is 1/e2(~3.5%) of its peak intensity. The pump beam diameter in the crystal is defined as the diameter of the image of the pump beam in the crystal. The intensity distribution of the pump beam is close to a top hat profile.

Although prior investigators have indicated that ratios less than unity should result in lasers that are not efficient, for either strong or weak thermal lens materials, the present invention produces a different result. In one embodiment, the combination of strong thermal lens laser crystals 86, 88, such as Nd:YVO$_4$, management of heat conduction through the "c" crystal faces, and the use of a fiber-coupled diode pump source results in a highly efficient laser that operates in the TEM$_{00}$ mode over a wide range of pump powers.

Nd:YAG can be used with similar results. An intracavity polarizer, such as a Brewster plate, is required to insure well-polarized output. In Nd:YAG, not only are thermal lensing and thermal aberrations problematic, but thermal birefringence is as well. With the present invention, it is found that the losses due to both effects are reduced significantly when the TEM$_{00}$ mode diameter in the crystal is slightly smaller than the pump beam diameter in the crystal. The areas of the Nd:YAG crystal that provide the greatest birefringence are at the edges of the pump beam diameter in the Nd:YAG crystal. The strongest depolarization effects are therefore seen when mode sizes typical for conventional mode matching are used. If the TEM$_{00}$ mode size is larger than the high power pump beam, then parts of the TEM$_{00}$ beam pass through the thermally birefringent areas, experience rotation, and then rejection or loss by an intracavity polarizer. With the present invention a pump beam size slightly larger than the TEM$_{00}$ mode diameter in the crystal minimizes losses due to birefringence.

Figure 8:
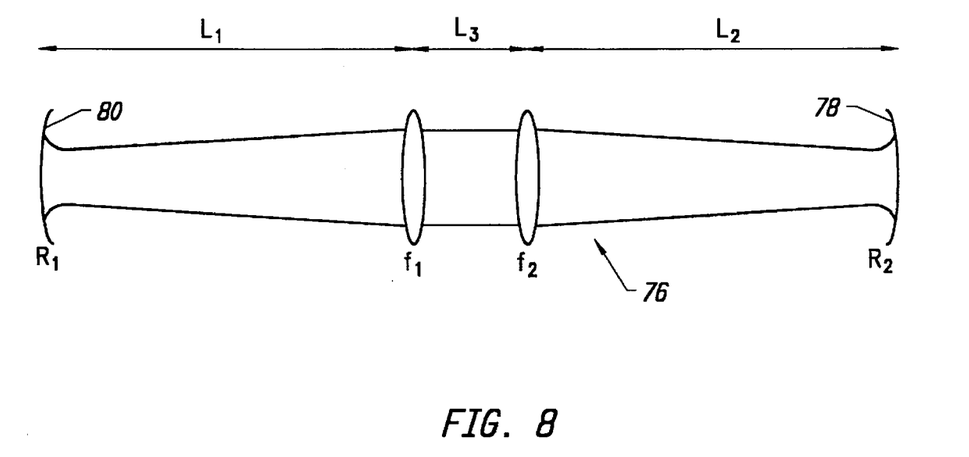
FIG. 8 is a schematic diagram of the resonator of FIG. 7, pulled apart to eliminate the folds, in order to show the relationship between L1, L2 and L3.

FIG. 8 illustrates a schematic of resonator 76 in an unfolded geometry. It is intended to show the respective lengths of components in resonator 76. For a symmetric resonator, L1=L2, F1=F2, R1=R2, and L3<<L1, L2.

Figure 9:
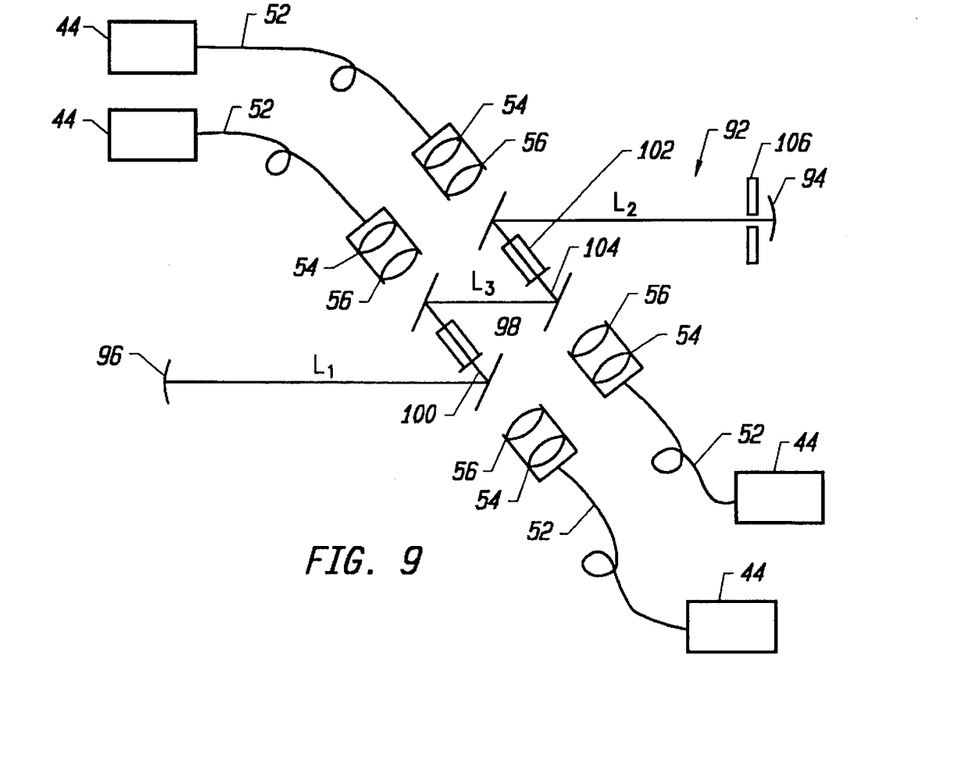
FIG. 9 is a schematic diagram of a double "Z" folded resonator.

A double "Z" folded confocal resonator 92 is illustrated in FIG. 9. Resonator 92 is defined by an output coupler 94 and a resonator mirror 96. A single laser crystal 98, or two crystals, is positioned along a first fold arm optical axis 100. A single laser crystal 102, or two crystals, is positioned along a second fold arm optical axis 102. An aperture 106 is used. Resonator 92 is symmetric if L1~L2, and L3<<L1, L2.

Figure 10:
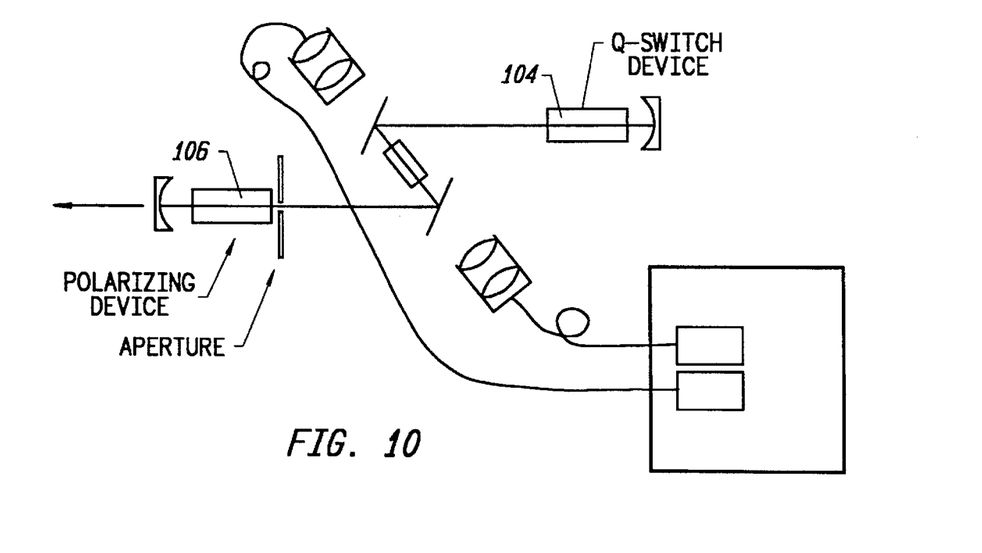
FIG. 10 is a schematic diagram of a confocal-to-concentric "Z" resonator, utilizing Nd:YAG or $Nd:YVO_4$. This resonator includes an optional Q-switch and an optional polarizing device.
Figure 11:
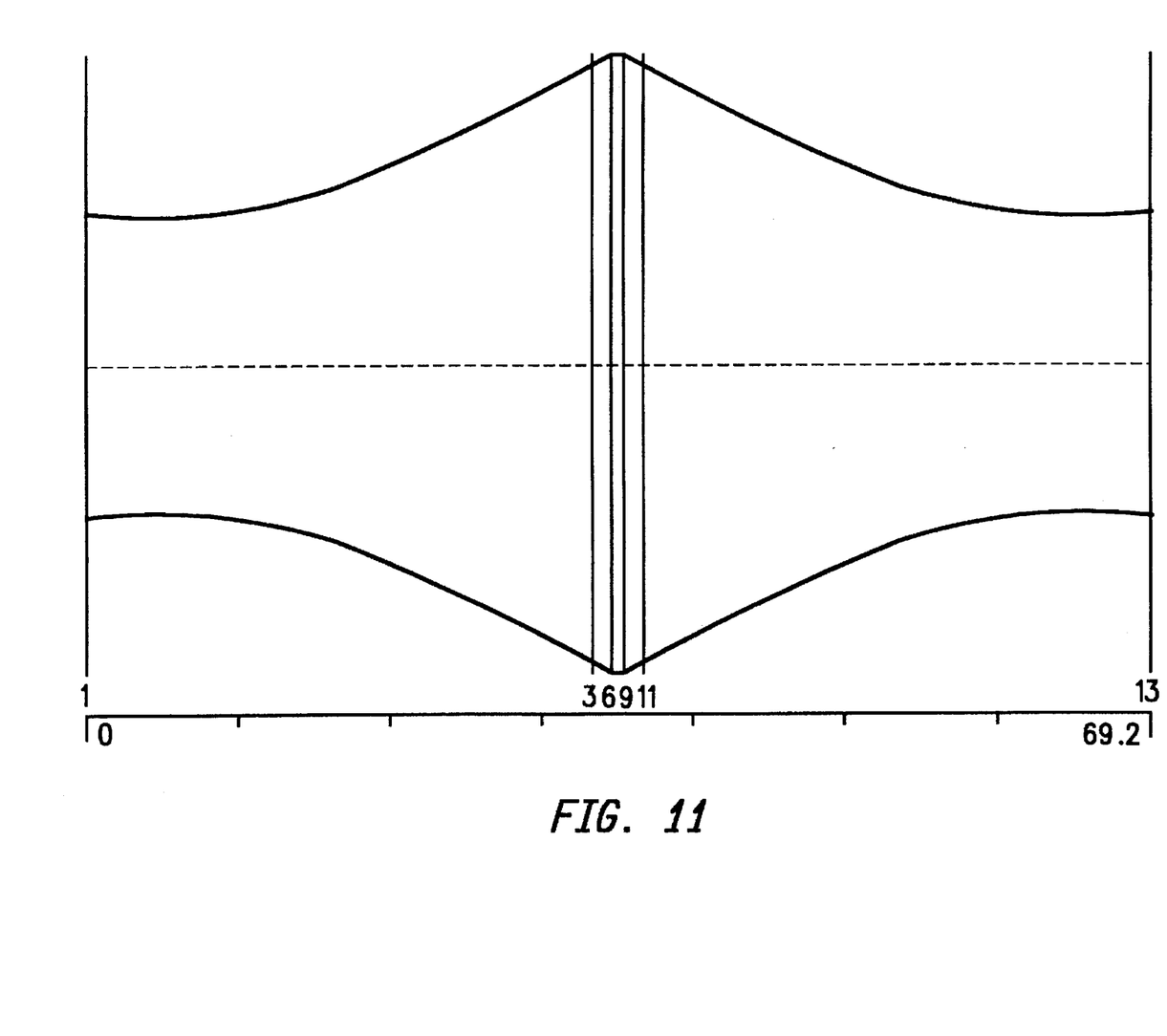
FIG. 11 is a schematic diagram of the $TEM_{00}$ mode size in a confocal-to-concentric resonator that contains a strong thermal lens or lenses.

One embodiment of a 2 port laser has the following characteristics, (i) output powers in the range of about 1–12 W, (ii) an overall optical efficiency greater than about 25% and preferably greater than 40%, (iii) an optical slope efficiency in a TEM$_{00}$ mode of greater than 40%, (iv) a ratio of the TEM$_{00}$ mode diameter to the pump beam diameter in the crystal in the range of about 1.2 to 0.8, preferably less than 1.0 to 0.83; an M$^2$ of less than 1.2, and preferably less than about 1.05 and (v) a least squares deviation of a beam profile from a gaussian of less than about 10%, and preferably about 1%. When Nd:YVO$_4$ is used, the output beam is naturally polarized, parallel to the "c" axis of the Nd:YVO$_4$ crystal. When Nd:YAG is used, the system can either be optimized as an unpolarized laser, or it can be polarized by the insertion of an intracavity polarizing element, such as one or more Brewster plates. FIG. 10 depicts a "Z" configuration resonator that includes an optional Q-switch 104 and a polarizing element 106. Suitable Q-switch devices are available from NEOS, in Melbourne, Fla. Either acousto-optic or electro-optic devices can be used. A preferred embodiment includes an acousto-optic Q-switch. Polarizing element 106 can be one or more Brewster plates, as are used when Nd:YAG is the laser crystal and a polarized output beam is required. When Nd:YVO$_4$ is used, the resonator dimensions are similar to those described for Resonator 76 of FIG. 7. When Nd:YAG is used, similar dimensions can be used, but a preferred embodiment is larger in overall length. The overall cavity length of a preferred embodiment with Nd:YAG is approximately 65 to 70 cm, with correspondingly larger mode sizes and pump beam sizes (for example 0.85 mm and 1.05 mm, respectively). The Nd:YAG system is approximately confocal-to-concentric, and is nearly symmetric. FIG. 11 depicts the mode size as a function of position in the resonator of FIG. 10. This mode size plot is very similar to the plot for Resonator 76 of FIG. 7. The TEM$_{00}$ mode size varies by just about a factor of two from one end to the other. The laser is about four Rayleigh ranges in length. It can be Q-switched from 0 to 50 kHz, with dynamically changing repetition rate, with minimal change to the mode sizes and very high Q-switched stability over this range. In contrast, resonator designs other than the confocal-to-concentric design can exhibit instabilities when Q-switched repetition rates are varied.

Thermal birefringence can be probiemetic when Nd:YAG is use. Additionally, strong thermal birefringence is seen in YAG. This is primarily because the index of refraction in these materials is a strong function of temperature (dn/dT is large), and the deposition of heat by the pump beam induces large thermal gradients. These gradients also induce stress, which also results in non-uniform changes in the index of refraction. It has been generally believed that strong thermal focussing and thermal birefringence is a hindrance in the design and construction of an efficient laser with high beam quality, and therefore, there has not been great success in the use of materials with strong thermal focussing and thermal birefringence in highly efficient, high power diode-bar-pumped lasers.

When Nd:YAG is used as the laser medium, an additional problem thermal birefringence in a high-power, end-pumped geometry. The effect of thermal birefringence is well-known in lamp-pumped Nd:YAG lasers (see for example Koechner, *Solid-State Laser Engineering*, vol. 3, p. 393). Many laser applications require a polarized beam; thermal birefringence results in spatially-dependent polarization rotation of parts of the cavity eigenmode within the laser crystal and thus loss when the eigenmode passes through an intracavity polarizer. This loss can be significant, and can severely limit the output power of a polarized laser. In the present invention, it is found that a TEM$_{00}$ mode size slightly smaller than the pump beam size minimizes loss due to thermal birefringence, especially when Nd:YAG is used. Fore example, a mode-size-to-pump-beam size-ratio of ~0.85 is found to be optimal in a high power, diode-end-pumped, polarized, Nd:YAG laser.

Changes and modifications in the specifically described embodiments can be carried out without departing from the scope of the invention which is intended to be limited only by the scope of the appended claims.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

We claim:

1. A high power diode pumped laser, comprising:
   at least one resonator mirror and an output coupler;
   at least one laser crystal providing a strong aberrated thermal lens;
   at least one diode pump source supplying an end-pumped pump beam to the laser crystal, producing a thermals lens in the laser crystal, the combination of the laser crystal, thermal lens, resonator mirrors and output coupler generally a confocal-to-concentric resonator, generating an output beam, wherein a TEM$_{00}$ mode diameter of the laser crystal is different from a diameter of the pump beam; and
   a power source supplying power to the diode pump source.

2. The laser of claim 1, further comprising:
   a Q-switch positioned in the resonator.

3. The laser of claim 2, wherein the laser crystal is made of Nd:YAG.

4. The laser of claim 3, wherein the output beam is polarized.

5. The laser of claim 1, wherein the laser crystal is made of Nd:YAG.

6. The laser of claim 1, wherein the laser crystal is made of Nd:YVO$_4$.

7. The laser of claim 6, wherein the Nd:YVO$_4$ laser crystal has a 0.5% doping.

8. The laser of claim 1, wherein a ratio of a TEM$_{00}$ mode diameter of the laser crystal to a pump beam diameter in the crystal is less than 1.0.

9. The laser of claim 8, wherein the diode pump beam has a diameter in the laser crystal larger than the TEM$_{00}$ mode diameter in the laser crystal to reduce loss due to thermal birefringence.

10. The laser of claim 1, wherein the laser has an optical slope efficiency in a TEM$_{00}$ mode of greater than about 40%.

11. The laser of claim 1, wherein the laser has an optical efficiency of greater than about 25%.

12. The laser of claim 1, wherein the output beam has a power greater than about 4 W.

13. A high power, diode pumped laser, comprising:
    at least one resonator mirror and an output coupler;
    at least one laser with strong thermal focussing properties;
    at least one diode pump source supplying an end-pumped pump beam to the laser crystal, producing a strong aberrated thermal lens in the laser crystal, the combination of the laser crystal, strong aberrated thermal lens, resonator mirrors and output coupler generally a confocal-to-concentric resonator that is greater than 0.5 Rayleigh range in length, generating an output beam with a power of 4 watts or greater, wherein a TEM$_{00}$ mode diameter of the laser crystal is different from a diameter of the pump beam; and
    a power source supplying power to the diode pump source.

14. The laser of claim 13, wherein the resonator is 1 to 2 Rayleigh range in length.

15. The laser of claim 13, wherein the resonator is 2 to 4 Rayleigh range in length.

16. The laser of claim 13, wherein the resonator is 4 to 10 Rayleigh range in length.

17. The laser of claim 13, further comprising:
    a Q-switch.

18. The laser of claim 17, wherein the laser crystal is made of Nd:YAG.

19. The laser of claim 18, wherein the resonator is about 4 Rayleigh ranges in length.

20. The laser of claim 13, wherein the laser crystal is made of Nd:YAG.

21. The laser of claim 20, wherein the output beam is polarized.

22. The laser of claim 13, wherein the laser crystal is made of Nd:YVO$_4$.

23. The laser of claim 22, wherein the Nd:YVO$_4$ laser crystal has a 0.5% doping.

24. The laser of claim 13, wherein a ratio of a TEM$_{00}$ mode diameter of the laser crystal to a pump beam diameter in the crystal is about less than 1.0, to 0.83 or greater.

25. The laser of claim 24, wherein the diode pump beam has a diameter in the laser crystal larger than the TEM$_{00}$ mode diameter in the laser crystal to reduce losses due to thermal birefringence.

26. The laser of claim 13, wherein the laser has an optical slope efficiency in a $TEM_{oo}$ mode of greater than about 40%.

27. The laser of claim 13, wherein the laser has an optical efficiency of greater than about 25%.

28. The laser of claim 13, wherein the output beam has a power greater than about 4 W.

29. A multi port, high efficiency, diode pumped laser, comprising:

a resonator mirror and an output coupler defining a confocal-to-concentric resonator, the resonator including first and second pump windows defining a first fold arm of the resonator, the first fold arm defining a first fold arm with a first fold arm optical axis;

a strong, thermal lens laser crystal positioned in the resonator along the first fold arm optical axis;

a first diode pump source, positioned adjacent to the first pump window, supplying a first end-pumped pump beam to the laser crystal in the laser resonator producing an output beam with a power of 4 watts or greater, wherein a $TEM_{oo}$ mode diameter of the laser crystal is different from a diameter of the first end-pumped pump beam;

a second diode pump source, positioned adjacent to the second pump window, supplying a second end-pumped pump beam to the laser crystal in the laser resonator producing the output beam; and at least one power source supplying power to the first and second pump sources.

30. The laser of claim 29, further comprising:

a Q-switch positioned in the resonator.

31. The laser of claim 30, wherein the laser crystal is made of Nd:YAG.

32. The laser of claim 29, wherein the laser crystal is made of Nd:YAG.

33. The laser of claim 32, wherein the output beam is polarized.

34. The laser of claim 29, wherein the laser crystal is made of $Nd:YVO_4$.

35. The laser of claim 34, wherein the $Nd:YVO_4$ laser crystal has a 0.5% doping.

36. The laser of claim 29, wherein a ratio of a $TEM_{oo}$ mode diameter of the laser crystal to a pump beam diameter in the crystal is about less than 1.0, to 0.83 or greater.

37. The laser of claim 36, wherein the diode pump beam has a diameter in the laser crystal larger than the $TEM_{oo}$ mode diameter in the laser crystal to reduce loss due to thermal birefringence.

38. The laser of claim 29, wherein the laser has an optical slope efficiency in a $TEM_{oo}$ mode of greater than about 40%.

39. The laser of claim 29, wherein the laser has an optical efficiency of greater than about 25%.

40. The laser of claim 29, wherein the output beam has a power greater than about 4 W.

41. A multi port, high efficiency, diode pumped laser, comprising:

a resonator mirror and an output coupler defining a confocal-to-concentric resonator, the resonator including first and second pump windows defining a first fold arm of the resonator, third and fourth pump windows defining a second fold arm of the resonator, the first fold arm defining a first fold arm optical axis, and the second fold arm defining a second fold arm optical axis;

a first strong aberrated thermal lens laser crystal positioned in the resonator along the first fold arm optical axis;

a second laser crystal positioned in the resonator along the second fold arm optical axis;

a first diode pump source, positioned adjacent to the first pump window, supplying a first end-pumped pump beam to the first crystal to produce an output beam with a power of 4 watts or greater wherein a $TEM_{oo}$ mode diameter of the laser crystal is different from a diameter of the first end-pumped pump beam;

a second diode pump source, positioned adjacent to the second pump window, supplying a second end-pumped pump beam to the first crystal to produce the output beam;

a third diode pump source, positioned adjacent to the third pump window, supplying a third end-pumped pump beam to the second crystal to produce the output beam;

a fourth diode pump source, positioned adjacent to the fourth pump window, supplying a fourth end-pumped pump beam to the second crystal to produce the output beam; and at least one power source supplying power to the first, second, third and fourth diode pump sources.

42. The laser of claim 41, further comprising:

a Q-switch positioned in the resonator.

43. The laser of claim 42, wherein the laser crystal is made of Nd:YAG.

44. The laser of claim 43, wherein the output beam is polarized.

45. The laser of claim 41, wherein the laser crystal is made of Nd:YAG.

46. The laser of claim 41, wherein the laser crystal is made of $Nd:YVO_4$.

47. The laser of claim 46, wherein the $Nd:YVO_4$ laser crystal has a 0.5% doping.

48. The laser of claim 41, wherein a ratio of a $TEM_{oo}$ mode diameter of the laser crystal to a pump beam diameter in the crystal is about less than 1.0, to 0.83 or greater.

49. The laser of claim 48, wherein the diode pump beam has a diameter in the laser crystal larger than the $TEM_{oo}$ mode diameter in the laser crystal to reduce loss due to thermal birefringence.

50. The laser of claim 41, wherein the laser has an optical slope efficiency in a $TEM_{oo}$ mode of greater than about 40%.

51. The laser of claim 41, wherein the laser has an optical efficiency of greater than about 25%.

52. The laser of claim 41, wherein the output beam has a power greater than about 4 W.

\* \* \* \* \*